United States Patent [19]

Galatis

[11] 3,967,256

[45] June 29, 1976

[54] INTEGRITY MONITORING SYSTEM FOR STORAGE TANK INSULATION

[75] Inventor: Telemachus Nicolas Galatis, London, England

[73] Assignee: Marine and Industrial Developments Limited, Piraeus, Greece

[22] Filed: Apr. 24, 1974

[21] Appl. No.: 463,783

[30] Foreign Application Priority Data

Apr. 26, 1973 United Kingdom............... 19951/73

[52] U.S. Cl................................. 340/242; 73/49.2; 220/9 LG
[51] Int. Cl.²......................................... G08B 21/00
[58] Field of Search............ 340/213 R, 242, 244 R; 73/40, 40.5, 49.2, 295, 340; 220/9 LG; 307/310

[56] References Cited

UNITED STATES PATENTS

| 1,778,398 | 10/1930 | Northrup............................. 340/242 |
| 1,801,791 | 4/1931 | Breisky et al........................ 340/242 |
| 1,915,576 | 6/1933 | Mullen................................ 340/242 |
| 1,922,029 | 8/1933 | Chesnut.............................. 340/242 |
| 3,413,840 | 12/1968 | Basile et al. ............................ 73/40 |
| 3,465,587 | 9/1969 | Pierce................................... 73/295 |

FOREIGN PATENTS OR APPLICATIONS 174,385 3/1953 Germany........................... 340/242

*Primary Examiner*—John W. Caldwell
*Assistant Examiner*—Daniel Myer
*Attorney, Agent, or Firm*—Cushman, Darby & Cushman

[57] ABSTRACT

The invention provides a method and apparatus for detecting impairment of the integrity of barriers used for the containment of fluid materials, particularly fluid materials at cryogenic temperatures, e.g., liquefied natural gas. The detection system employs electrical conductors which are in physical relationship to the barrier and undergo a change in current conducting function in the event of barrier failure. In the containment of fluid at low temperatures the detection system preferably comprises conductors which have temperature dependent resistances and are embedded within the thickness of the barrier. By distribution of conductors over different notional zones of the barrier area and provision of associated warning devices the location of leakage points within the barrier area can be automatically indicated.

7 Claims, 5 Drawing Figures

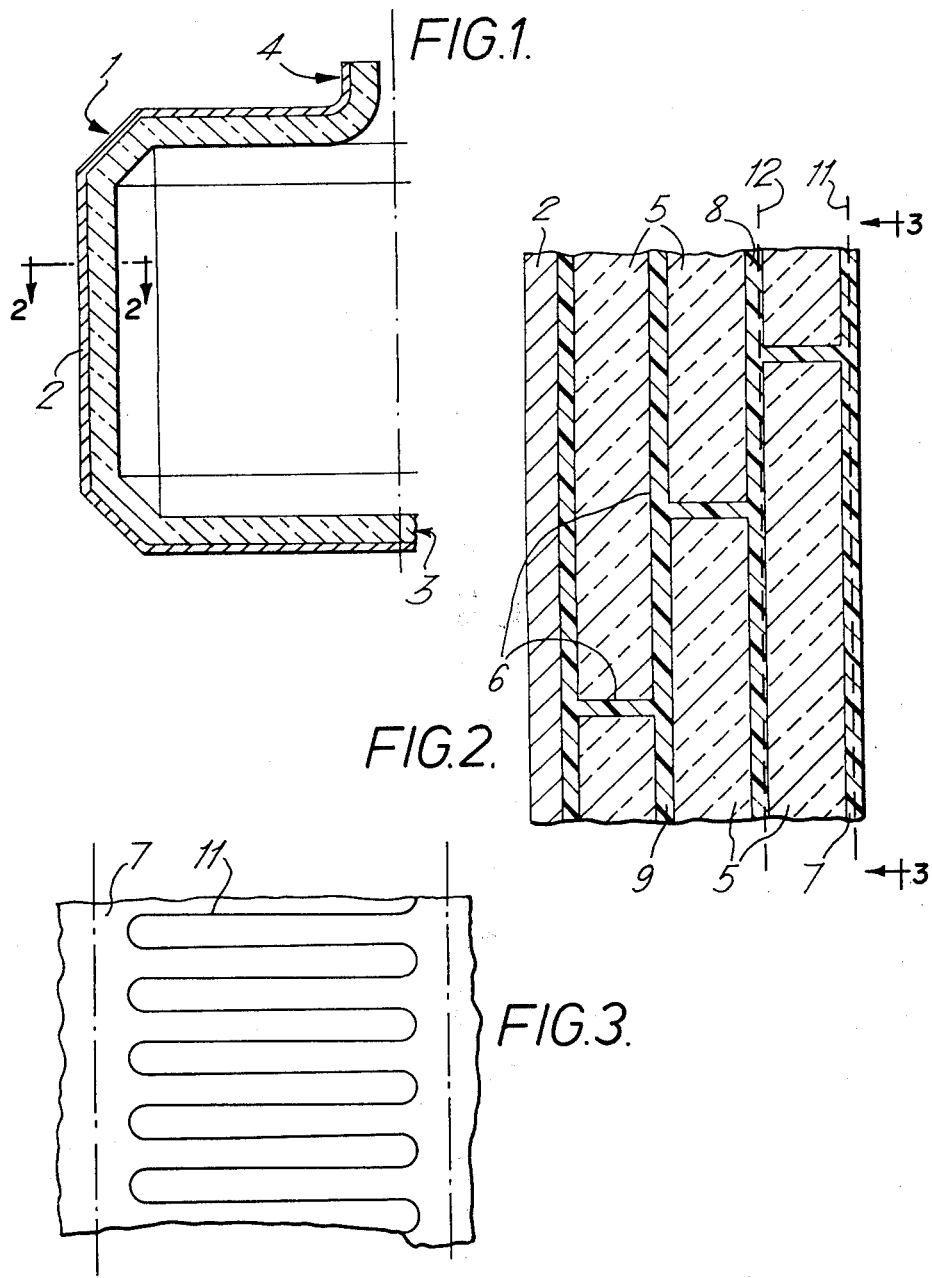

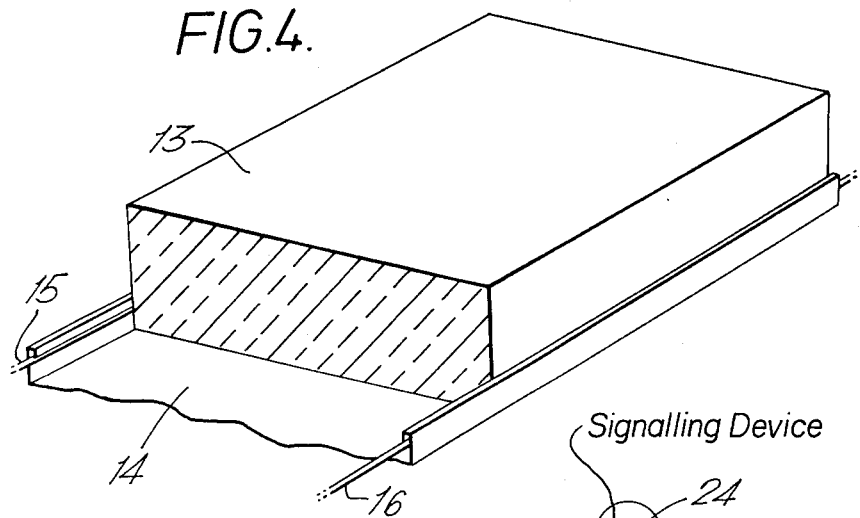
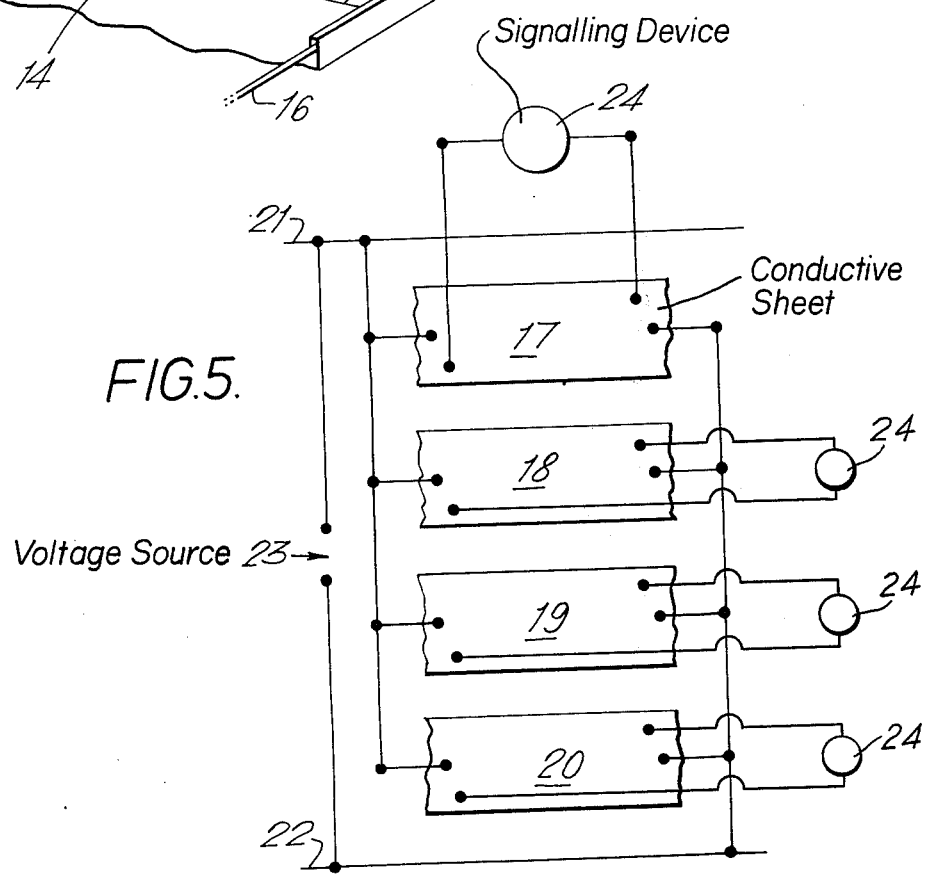

INTEGRITY MONITORING SYSTEM FOR STORAGE TANK INSULATION

This invention relates to detection systems for detecting integrity impairment of barriers for use in the containment of fluids, particularly fluids at cryogenic temperatures.

An example of such a barrier is the wall of a container for storing liquefied gas at atmospheric or near atmospheric pressure. Another example is the wall of a conduit for conveying a liquefied gas.

Such barriers may become impaired for a variety of reasons, depending on the physical form and composition of the barriers and the conditions to which they are exposed. By way of example, the integrity of a barrier may become impaired by mechanical forces imposed on it, by stresses imposed due to temperature changes, or as a result of chemical action.

A loss of integrity of a said barrier may have seriously adverse consequence. For example one consequence may be the leakage of fluid material into or through the barrier to place where such material constitutes a safety hazard.

There are various known methods of detecting leakages of fluid through fluid flow barriers, e.g., through the walls of a container for the fluid. One such method involves infrared gas analysis. Another such method involves sampling a fluid of different composition circulated in contact with the opposite side of the barrier so as to detect the presence of any fluid which may have leaked through it.

The known detection methods are not easily performed and cannot provide a very rapid result. Moreover such methods are not practical for use over long periods of time for monitoring or testing barriers of large area exposed to large volumes of fluid.

Another important disadvantage of the known methods is that they cannot without much complication and the performance of repetitive operations enable the site of a defect, when it occurs, to be identified. The absence of any indication of where a defect exists is a serious drawback when very large barrier areas are involved. By way of example, in the storage of certain liquefied gases use is made of storage tanks of very large capacity measured in thousands of cubic meters.

There is therefore need for a system whereby the tank walls or constituent layers thereof can be tested and/or monitored to obtain an immediate indication not only of the leakage of fluid into or through a barrier wall but also some indication as to the part of the wall area in which the defect is located so that repair or other remedial action can be effected without undue delay.

The object of the present invention is to provide a detection system which yields rapid indication of barrier defects and can operate automatically over long periods of time.

A secondary object of the invention is to provide a detection system which can easily be arranged to indicate in which of a number of different zones of the barrier a defect occurs.

According to the present invention, a detection system for detecting integrity impairment of a barrier for use in the containment of fluid material is characterised in that such system comprises at least one detector in the form of an electrical conductor which is connected to a warning device actuatable in dependence on the electrical current conducting function of such conductor, and in that said conductor is disposed in a physical relationship to said barrier such that if the integrity of the barrier is impaired at the site of such conductor when the barrier is in use, this impairment leads to a change in the said current-conducting function causing actuation of said warning device.

It is an important advantage of the invention that a defect in the barrier leading to leakage of fluid can be signalled automatically and almost immediately. Another advantage of the invention is that it is easily possible by a suitable distribution of the conductor or conductors to monitor defects at any position within a very large barrier area, such as the walls of very large capacity storage tanks. A further advantage of the invention is that by independently associating a plurality of warning devices with different electrical conductors which are arranged in different zones within the area of the barrier, it is possible to obtain automatic indication of the zone in which a defect occurs.

The invention is of particular importance as applied to barriers exposed to fluid material at cryogenic temperature, e.g. liquefied natural gas.

In the most important embodiments of the invention, which are suitable in low temperature containment, the or each electrical conductor has a positive temperature coefficient of resistance and is embedded within a thermally insulating barrier, and such conductor is connected to a voltage source and to a warning device which is actuated in the event of a decrease in the resistance of such conductor. By such a system, penetration of cold fluid into internal layers of the barrier, causing significant lowering of the temperature of an electrical conductor, is instantly signalled. The penetration of cold fluid into internal layers of a thermally insulating barrier is often potentially a very dangerous situation, e.g., in the case that the barrier is used to maintain a very low temperature fluid out of contact with a surrounding steel structure, e.g., the structural shell of a storage tank.

In a system as just described, wherein the electrical current conducting function of the detector or detectors is temperature-dependent, it is particularly advantageous to employ detectors in the form of electrically conductive sheets or coating layers, each sheet or layer covering a given zone within the barrier area to be monitored. Such a zone may for example have length and breadth dimensions of 1 meter or more. In other constructions of such a temperature-dependent system, electrically conductive wires or strips are employed, each wire or strip following a path which is distributed over a given zone within the barrier area to be monitored.

In some embodiments of the invention, the barrier includes a fluid-impervious membrane which is located so that it will rupture in the event of fluid leakage and there is at least one detector in the form of an electrical conductor which breaks if such rupture occurs and which is connected to a voltage source and to a warning device which is actuated if the actuating circuit is broken. Thus the invention as hereinbefore defined includes systems wherein actuation of a warning device is dependent on a conductor acquiring a zero current conducting function. Such a detection system is very suitable for use in association with a membrane which is directly exposed to the fluid to be contained. Such a system can be employed in connection with barriers for containing fluid material at ordinary ambient temperature. When used in low temperature containment situations, such a system can if desired be used in conjunction with a temperature-dependent system as hereinbefore referred to, the different systems being disposed at different levels in the thickness of a thermally insulating barrier.

In a third type of system according to the invention, useful in low temperature containment, there is at least one set of differently constituted electrical conductors which are connected to a said warning device and which are spaced apart in the direction of the thickness of a thermally insulating barrier and such conductors operate as a thermo-couple whereby the warning device is actuated when the difference between the temperatures of the two conductors decreases due to fluid leakage into the barrier at the zone where such conductors are located.

The invention is of particular importance as applied to barriers used for the containment of liquefied natural gas which is at atmospheric pressure or a pressure which is not greatly above atmospheric pressure. Under atmospheric pressure liquefied natural gas has to be held at about −165°C. The safe monitoring of the integrity of thermally insulating barriers containing such liquefied gas is a prerequisite for the safe storage of the material in land-based and marine storage tanks, particularly when using tanks having a structural shell of ordinary steel such as Grade A or Grade D steel, which suffers embrittlement if exposed to the extreme cold of the stored material.

The invention includes any tank or other container incorporating a fluid flow barrier with an associated detection system as hereinbefore specified.

Certain embodiments of the invention will now be described by way of example and with reference to the accompanying drawings, in which:

FIG. 1 is a half sectional elevation of a cryogenic storage tank;

FIG. 2 is a cross-section of part of the tank wall taken on the line 2—2 of FIG. 1; FIG. 3 is a plan view of a primary barrier forming part of the tank lining looking in the direction of the arrows 3—3 in FIG. 2;

FIG. 4 is a perspective view, partly in cross-section, showing a detail of part of an alternative tank lining construction; and FIG. 5 is a diagrammatic representation of part of the electric circuitry of a complete detection system.

The storage tank, part of which is shown in FIG. 1, is for the containment of liquefied natural gas at substantially atmospheric pressure. The tank 1 comprises a shell 2 of ordinary steel on the inside of which is a thermally insulating lining generally designated 3 which extends over the whole of the interior of the shell and into a top opening 4 thereof. The lining 3 forms a fluid containment barrier holding the tank contents spaced from the tank shell.

The composition of the lining is apparent from FIG. 2 which shows a part of the tank shell and of the lining. The lining is built up from rectanguloid volumes such as 5 of highly insulating load-bearing material, e.g. foamed polyurethane, which are laid up like brickwork with intervening layers such as 6 of fluid-impervious elastomer. The layers 6 together form a unitary cellular matrix enclosing the volumes of insulating material. The cellular matrix is preferably composed of one or more urethane rubbers. Urethane rubbers which are very suitable for the purpose are to be found among those marketed by E.I. DuPont de Nemours under the trade marks "Adiprene" and "Hytrel", e.g., "Adiprene L-167", "Adiprene L-200", "Adiprene L-420" and "Hytrel 5550". The layers forming the cellular matrix can be formed in situ by applying, under and between and over the thermally insulating volumes 6, a prepolymer and coupling agent in appropriate proportions, or a curable liquid synthetic elastomer composition, and curing or vulcanising the composition in situ. For example urethane rubbers can be formed by reacting an unstable or stable isocyanate prepolymer with a chain extender. Thus a prepolymer can be obtained by reacting a polymer containing 5 to 20 tetramethylene ether glycol units with toluene diisocyanate, such prepolymer then being subjected to inter-and intra-molecular polymerisation by means of a coupling agent, e.g. an amino, polyamino or polyol compound. In an alternative method of forming urethane rubbers, a mixture of a suitable polyol, chain extender and catalyst is reacted with a di-isocyanate, so avoiding difficulties of handling a viscous preoplymer.

The masses 5 of thermally insulating material may, e.g., have length and breadth dimensions in the range 1m to 2m. The overall thickness of the lining is suitably of the order of 20cm to 30cm.

The cellular matrix of elastomeric material, formed by the layers 6, provides a continuous innermost skin or membrane 7 which is directly exposed to the tank contents and forms what is known as the primary fluid containment barrier. The cellular matrix also provides a secondary barrier 8 and a tertiary barrier 9.

When the tank is in use the primary barrier 7 is at the temperature of the tank contents, viz. about −165°C. The temperature at the position of the secondary barrier 8 is about −100°C; the temperature at the position of the tertiary barrier 9 is about −50°C; whereas the shell is externally exposed to ambient temperatures.

The storage tank incorporates a detection system according to the invention for detecting failure of the tank lining giving rise to leakage of fluid into the lining. This system includes detectors located at the positions of the primary membrane barrier 7 and also at the position of the secondary membrane barrier 8.

The total projected area of the primary membrane 7 is divided into notional zones in each of which there is an elongated electrical conductor 11 which is laid along a zig-zag course over the zone as is represented in FIG. 3 in which the opposed boundaries of one zone are indicated by chain lines. By way of example each zone may be a strip-like zone having a length of 10 meters and a width of 1 meter and the conductor may laterally traverse the zone forty times per meter of the zone length.

The primary membrane 7 is built up from two layers of the selected elastomer and the conductor 11 is sandwiched between those layers. The conductor 11 may be in the form of a prefabricated conductive wire or strip, or it may be a conductive coating formed on one of the said elastomer layers e.g., by a method well known in printed circuitry, by spraying or otherwise. The conductor may be composed of aluminium, graphite or any other suitable electrically conductive material. A primary requirement of the conductor is that it is physically sustained by the elastomeric membrane 7 in the sense that if this membrane locally ruptures and tears, the conductor 11 will inevitably break.

Each of the conductors 11 is electrically connected via feeder lines (not shown) which lead out of the top opening 4 of the tank and are connected to a source of E.M.F. As a specific example, for a conductor 11 having a length of 400 meters, a diameter of 0.1 mm and an electrical resistance of $1.6 \times 10^3$ ohms it is suitable to employ a direct E.M.F. source of 12 volts to give a current through the wire of $7.5 \times 10^{-3}$ amps. In the circuit of each conductor 11 there is provided, externally of the tank, a warning device which yields an audio and/or optical signal in the event of breakage of the conductor 11. The warning devices pertaining to the multiplicity of zones may be grouped together on a console or observation panel. It is within the scope of the invention for the circuits incorporating the conductors 11 to be electrically connected to control devices such as valves for automatically initiating safety measures to reduce accident hazards.

At the position of the secondary barrier 8 there are electrical conductors 12 which likewise occupy different notional zones within the projected area of the lining. Those zones may but need not coincide with the zones into which the primary barrier is divided. The conductors 12 form part of a detection system which is more important than the primary barrier detection system. Leakage of cold fluid to the position of the second barrier is a critical condition the early detection of which is vital for safety reasons. It would in fact be viable to provide only the detection system at the secondary barrier level and in an alternative embodiment of the invention the primary barrier detection system is in fact dispensed with.

The conductors 12 are located between the secondary membrane 8 and the outermost layer of insulating bodies 5. The conductors 12 have the important characteristic that they have a positive temperature coefficient of resistance. A suitable material for these conductors is aluminium alloy, e.g., the alloy marketed under Type No. 1470 NS3 by the Aluminium Company of America which undergoes a drop in resistance of approximately 100% with fall of temperature over the range $-100°C$ to $-165°C$.

The conductors 12 may be of wire or strip form as described for the conductors 11. Preferably however the conductors 12 cover rectangular or other panel-like areas. The conductive material may for example be applied as a coating onto the substrate formed by the underlying elastomer membrane 8.

In optimum embodiments of the invention, each conductor 12 comprises a sheet of electrically conductive foil. In a particular system, use was made of sheets of foil each measuring 1m × 1m and having a thickness 0.15 and 0.2 mm, the foil being composed of an aluminium alloy such as Type No. 1470 NS3 above referred to.

Instead of laying the conductive sheets entirely flat as depicted in FIG. 2, the margins of the sheets may be folded against the side and end faces of the insulating bodies 5. Such an arrangement is shown in FIG. 4 which shows an insulating block 13 with a sheet 14 of aluminium alloy foil adhesively secured to its bottom face. The four margins of the foil are folded double and are secured against the side and end faces of the block 13. Feeder lines 15 and 16 from a source of E.M.F. are sandwiched and secured in the folds at one pair of opposed margins of the sheet.

In the event of leakage of the liquefied gas past the primary barrier 7 and into the immediate vicinity of any of the conductors 12, such conductor becomes more conductive and the increased electrical current flow operates a suitable warning device, e.g., through the agency of an electromagnetic relay.

Bearing in mind this function of the system, various possible circuit arrangements will at once be apparent to those versed in the art. It will suffice therefore to indicate briefly by reference to FIG. 5 one possible way of integrating the various conductors into a complete detection system. FIG. 5 shows parts of four conductive sheets 17, 18, 19 and 20, which are to be considered as disposed in different zones of a secondary membrane area, like the conductors 12 in FIG. 2. The sheets are connected in parallel between feeder lines 21, 22 which are connected at 23 to a voltage source. The sheet 17 forms part of an electric circuit including a signalling device 24 which responds to an increase in the conductivity of the sheet such as is occasioned by a drop in its temperature indicative of fluid leakage. Each of the other sheets is similarly connected to a signalling device.

For a large capacity storage tank, for example one having a total projected insulation area of about 5000 $m^2$ there may be several hundred separate conductive sheets each with an associated warning device. However the number of zones into which the system is divided depends on the selectivity required. It is not an essential feature of the invention for the system to indicate the zone of location of a fault although the provision of that feature is very advantageous in some fields of use.

An alternative type of circuitry which can be employed is to connect the conductors of different zones together so that they form the resistances of a Wheatstone bridge circuit which is fed from a voltage source and is connected to a signalling device which responds to imbalance of resistances, thereby indicating a fault in one of the said zones.

In a further embodiment of the invention (not illustrated) two opposed conductors made of different conductive materials are disposed in each zone and at different positions within the thickness of the barrier. For example one conductor is disposed at the level of the secondary barrier and the other at the level of the primary or at the position of the tertiary barrier. The conductors operate as a thermocouple to cause or modify electric current flow and thereby actuate a warning device. However the other types of detection system previously described are much preferred.

The invention is applicable not only in relation to barriers for containing fluid material at sub-zero temperatures, e.g., liquefied petroleum gas or liquefied natural gas, but also in relation to barriers for the containment of any fluid material out of contact with materials or components likely to be impaired by contact with such fluid due to chemical action or other phenomenon.

It is not essential in a temperature-dependent detection system according to the invention to employ a conductor or conductors having a positive temperature coefficient of resistance. A conductor having a negative coefficient can be employed in any zone provided of course the associated warning device is arranged to respond to decrease in the value of the electrical current in such conductor. Conductive materials alternative to those hereinbefore mentioned which can be used in a temperature-dependent system include silver, copper and carbon.

I claim:

1. A detection system for detecting integrity impairment of a thermally insulating barrier for use in the containment of fluid material at cryogenic temperature, in which system there is provided, in each of a plurality of notional zones within the area of the said barrier, at least one detector in the form of an electrical conductor which is distributed over said zone and which has a temperature-dependent coefficient of electrical resistance; said conductor is disposed within the thickness of said barrier so as to be subjected to cooling in the event of leakage of cryogenic fluid into the barrier within the zone to which that conductor pertains, when the barrier is in use; and the said conductors distributed over the different notional zones are electrically connected to a voltage source and to different warning devices each actuatable in dependence on a lowering of the temperature and consequent change in the electrical conductivity of the associated one of said conductors.

2. A detection system according to claim 1, wherein at least one of said conductors having a temperature-dependent coefficient of electrical resistance comprises an electrically conductive layer extending over the appertaining notional zone.

3. A detection system according to claim 1, wherein at least one of said conductors having a temperature-dependent coefficient of electrical resistance comprises an electrically conductive member following a path which is distributed over the appertaining notional zone.

4. In combination with a container for the storage of fluid material at cryogenic temperature, siad container comprising a structural shell having a thermally insulating lining incorporating at least one fluid-impermeable barrier, a detection system for detecting integrity impairment of such barrier in which system there is provided, in each of a plurality of notional zones within the projected area of the said barrier, at least one detector in the form of an electrical conductor which is distributed over said zone and is connected to a source of electric current and to a warning device located outside said container and actuatable in dependence on the electrical current conducting function of such conductor, such conductor being disposed in a physical relationship to said barrier such that said conductor is affected by impairment of the integrity of the barrier causing fluid leakage depthwise of said lining within the zone to which that conductor pertains, whereby the said current-conducting function of such conductor undergoes a change causing actuation of the appertaining warning device.

5. A combination according to claim 4, wherein said lining incorporates a primary fluid-impermeable barrier exposed to the container contents and a secondary fluid-impermeable barrier spaced between said primary barrier and said shell, and wherein in each of a said plurality of notional zones there is at least one detector in the form of an electrical conductor which is distributed over said zone at the position of said secondary barrier and which has a temperature-dependent coefficient of electrical resistance.

6. A combination according to claim 4, wherein said lining incorporates a primary fluid-impermeable barrier exposed to the container contents, said primary barrier being in the form of a membrane of elastomeric material, and wherein in each of a said plurality of notional zones there is at least one detector in the form of an electrical conductor which is disposed within and is physically sustained by said membrane with the result that such conductor ruptures in the event of rupture of said membrane.

7. A container for the storage of fluid material at cryogenic temperature, wherein said container has a structural steel shell having a thermally insulating lining comprising a cellular matrix of elastomeric material providing a primary fluid-impermeable barrier exposed to the container contents and a secondary fluid-impermeable barrier spaced between said primary barrier and said steel shell, said lining also comprising volumes of thermally insulating load-bearing material enclosed in the cells of said matrix; and wherein a detection system for detecting impairment of the integrity of at least one said fluid-impervious barrier is provided, such detection system comprising, in each of a plurality of notional zones within the projected area of the said lining, at least one detector in the form of an electrically conductive foil which is distributed over said zone and is connected to a source of electric current and to a warning device outside said container, said foil having a temperature-dependent coefficient of electrical resistance to cause operation of the appertaining warning device in the event of cooling of such foil caused by leakage of cryogenic fluid depthwise of said lining within the zone to which that foil pertains; the detectors belonging to different said notional zones being connected to different said warning devices.

* * * * *